United States Patent
Lee et al.

(10) Patent No.: US 10,199,875 B2
(45) Date of Patent: Feb. 5, 2019

(54) WIRELESS POWER TRANSFER SYSTEM

(71) Applicant: LG INNOTEK CO., LTD., Seoul (KR)

(72) Inventors: Jong Heon Lee, Seoul (KR); Soo Young Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/321,532

(22) PCT Filed: Jun. 25, 2015

(86) PCT No.: PCT/KR2015/006501
§ 371 (c)(1),
(2) Date: Dec. 22, 2016

(87) PCT Pub. No.: WO2015/199466
PCT Pub. Date: Dec. 30, 2015

(65) Prior Publication Data
US 2017/0141605 A1    May 18, 2017

(30) Foreign Application Priority Data

Jun. 25, 2014  (KR) .......................... 10-2014-0078248

(51) Int. Cl.
| | |
|---|---|
| *H02J 7/00* | (2006.01) |
| *H01F 27/42* | (2006.01) |
| *H02J 50/12* | (2016.01) |
| *H02J 7/02* | (2016.01) |
| *H02J 50/60* | (2016.01) |

(Continued)

(52) U.S. Cl.
CPC .............. *H02J 50/12* (2016.02); *H02J 7/025* (2013.01); *H02J 50/20* (2016.02); *H02J 50/60* (2016.02); *H02J 50/80* (2016.02); *H02J 2007/0001* (2013.01); *H02J 2007/0096* (2013.01)

(58) Field of Classification Search
CPC ........................................................ H02J 7/025
USPC .......................................................... 320/108
See application file for complete search history.

(56) References Cited

U.S. PATENT DOCUMENTS

| | | |
|---|---|---|
| 2007/0021066 A1 | 1/2007 | Dravida et al. |
| 2011/0105038 A1 | 5/2011 | Kushida et al. |
| 2012/0080957 A1 | 4/2012 | Cooper et al. |

(Continued)

FOREIGN PATENT DOCUMENTS

| | | |
|---|---|---|
| CN | 101227209 A | 7/2008 |
| CN | 102055511 A | 5/2011 |

(Continued)

*Primary Examiner* — Edward Tso
*Assistant Examiner* — Ahmed Omar
(74) *Attorney, Agent, or Firm* — Birch, Stewart, Kolasch & Birch, LLP (57) ABSTRACT

A transmitter for transmitting wireless power according to an embodiment of the present invention includes a transmission side communication unit, wherein the transmission side communication unit transmits a first control signal to a reception side communication unit, then receives a second control signal including information about an amount of power of the first control signal from the reception side communication unit, and controls the amount of power of the first control signal by comparing the amount of power of the first control signal with a predetermined range based on the second control signal.

15 Claims, 8 Drawing Sheets

(51) Int. Cl.
*H02J 50/80* (2016.01)
*H02J 50/20* (2016.01)

(56) References Cited

U.S. PATENT DOCUMENTS

| | | |
|---|---|---|
| 2012/0244822 A1 | 9/2012 | Kim et al. |
| 2014/0125139 A1 | 5/2014 | Wang et al. |
| 2014/0308996 A1 | 10/2014 | Byun et al. |
| 2014/0346888 A1 | 11/2014 | Kim et al. |
| 2015/0155918 A1 | 6/2015 | Van Wageningen |
| 2015/0270738 A1* | 9/2015 | Colja .................. H02J 7/025 307/104 |
| 2016/0254705 A1* | 9/2016 | Jung .................... H02J 50/40 307/104 |

FOREIGN PATENT DOCUMENTS

| | | |
|---|---|---|
| CN | 103460617 A | 12/2013 |
| CN | 103782486 A | 5/2014 |
| CN | 103812227 A | 5/2014 |
| KR | 10-2013-0067955 A | 6/2013 |
| KR | 10-2014-0058331 A | 5/2014 |
| WO | WO 2014/001983 A1 | 1/2014 |

* cited by examiner

WIRELESS POWER TRANSFER SYSTEM

CROSS REFERENCE TO RELATED APPLICATIONS

This application is the National Phase of PCT International Application No. PCT/KR2015/006501, filed on Jun. 25, 2015, which claims priority under 35 U.S.C. 119(a) to Patent Application No. 10-2014-0078248, filed in the Republic of Korea on Jun. 25, 2014, all of which are hereby expressly incorporated by reference into the present application.

BACKGROUND

1. Field

Embodiments relate to a wireless power transfer system.

2. Background

A wireless power transfer (WPT) system is a technology for transferring power without wires through a space, and maximizes the convenience of power supply to mobile devices and digital home appliances.

The WPT system has advantages such as saving energy through real-time power usage control, overcoming space limit of power supply, reducing waste battery discharge using battery recharging, and the like.

As a method of implementing the WPT system, there are typically a magnetic induction method and a magnetic resonance method.

The magnetic induction method is a noncontact energy transfer technique in which two coils are brought close to each other to cause a current to be supplied to one coil and an electromotive force is generated in the other coil via a magnetic flux generated in accordance with the current, and uses frequencies of hundreds of kHz.

The magnetic resonance method is a magnetic resonance technique using only an electric field or a magnetic field without using electromagnetic waves or current, and has a distance enabling power transfer of several meters or more, so that it uses a band of tens of MHz.

Meanwhile, in the WPT system, A4WP that is a resonant wireless charging standard occupies an industrial scientific and medical (ISM) band using Bluetooth communication. However, since the ISM band has been already used as communication frequencies (wireless LAN (WLAN), Bluetooth, Zigbee, RFID, etc.) of a lot of wireless communication, there has been a problem that deteriorates the performance of wireless communication devices using the nearby ISM band at the time of wireless charging.

SUMMARY

Embodiments provide a wireless power transfer (WPT) system that can minimize electrical interference to other wireless communication devices occupying an ISM (industrial scientific and medical) band.

In addition, embodiments provide a WPT system that can improve the charging efficiency by varying the communication period between a transmitter and a receiver and reduce an interference phenomenon on other adjacent wireless communications.

In addition, embodiments provide a WPT system that can reduce an interference phenomenon on other adjacent wireless communications by adjusting the power of communication signals between a transmitter and a receiver.

A transmitter for transmitting wireless power according to an embodiment of the present invention includes a transmission side communication unit, wherein the transmission side communication unit transmits a first control signal to a reception side communication unit, then receives a second control signal including information of an amount of power of the first control signal from the reception side communication unit, and controls the amount of power of the first control signal by comparing the amount of power of the first control signal with a predetermined range based on the second control signal.

Here, the second control signal may further include a charged amount of a battery of a receiver and reception strength information of the first control signal.

Also, the first control signal may be a request signal for requesting the second control signal.

Also, when the amount of power of the first control signal is out of the predetermined range, the amount of power of the first control signal may be reduced.

Also, when the amount of power of the first control signal is within the predetermined range, the amount of power of the first control signal may be maintained.

Also, the receiver may receive charging power in a resonant method.

Also, the transmission side communication unit and the reception side communication unit may perform communication in a Bluetooth method.

Also, in an initialization operation in which the transmitter detects the receiver and prepares to transmit wireless charging power, the amount of power of the first control signal may be constant.

Also, the transmission side communication unit and the reception side communication unit may occupy an industrial scientific and medical (ISM) band using the Bluetooth method.

A transmitter for transmitting wireless power according to another embodiment of the present invention includes a transmission side communication unit, wherein the transmission side communication unit transmits a first control signal to a reception side communication unit, receives a second control signal from the reception side communication unit, and compares the second control signal and a predetermined value to control a transmission period of the first control signal.

Here, the second control signal may include a charged amount of a battery of a receiver and reception strength information of the first control signal.

Also, the first control signal may be a request signal for requesting the second control signal.

Also, when the charged amount of the battery of the receiver is equal to or larger than the predetermined value, the transmission period of the first control signal may be increased.

Also, when the charged amount of the battery of the receiver is less than the predetermined value, the transmission period of the first control signal may be reduced.

Also, the receiver may receive charging power in a resonant method.

Also, the transmission side communication unit and the reception side communication unit may perform communication in a Bluetooth method.

Also, in an initialization operation in which the transmitter detects the receiver and prepares to transmit wireless charging power, the transmission period of the first control signal may be constant.

Also, the transmission side communication unit and the reception side communication unit may occupy an ISM band using the Bluetooth method.

A receiver for receiving wireless power according to still another embodiment of the present invention includes a reception side communication unit that receives a first control signal from a transmitter, wherein the reception side communication unit outputs a second control signal including reception strength of the first control signal to the transmitter in response to the first control signal, and receives the first control signal whose amount of power is adjusted according to a comparison between the reception strength of the first control signal and a predetermined value based on the second control signal.

A receiver for receiving wireless power according to yet another embodiment of the present invention includes a reception side communication unit that receives a first control signal from a transmitter; and a battery that receives wireless power from the transmitter, wherein the reception side communication unit outputs a second control signal including a charged amount of the battery to the transmitter in response to the first control signal, and receives the first control signal whose transmission period is adjusted according to a comparison between the charged amount of the battery and a predetermined value based on the second control signal.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a wireless power transfer (WPT) system including a WPT transmitter and a WPT receiver according to embodiments of the present invention will be described in detail with reference to the accompanying drawings. Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and thicknesses of devices may be exaggerated for convenience. Like numbers refer to like elements throughout the description.

According to embodiments, various frequency bands from a low frequency (50 kHz) to a high frequency (15 MHz) may be selectively used for WPT, and it is necessary to support a communication system capable of exchanging data and control signals for the purpose of system control.

Embodiments may be applied to various industrial fields such as a mobile terminal industry, a household appliance industry, an electric automobile industry, a medical device industry, a robot industry, etc., which use electronic devices using or requiring a battery.

According to embodiments, a system capable of transmitting power to one or more multiple devices using a single transmission coil may be considered.

Terms and abbreviations used in the embodiments are as follows.

WPT system: system for providing WPT within a magnetic field region

Figure 1:
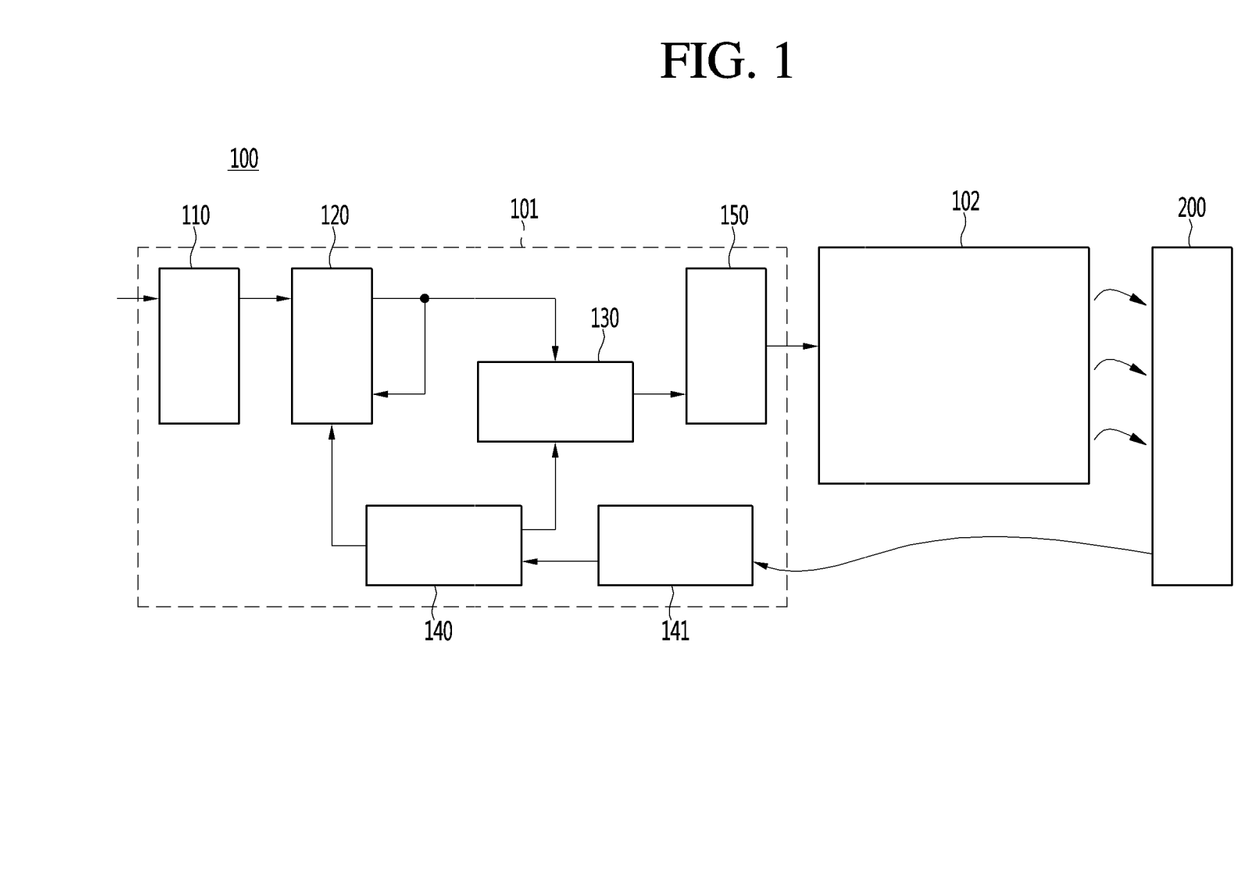
FIG. 1 is a block diagram illustrating a transmitter of a wireless power transfer (WPT) system according to an embodiment of the present invention.
Figure 2:
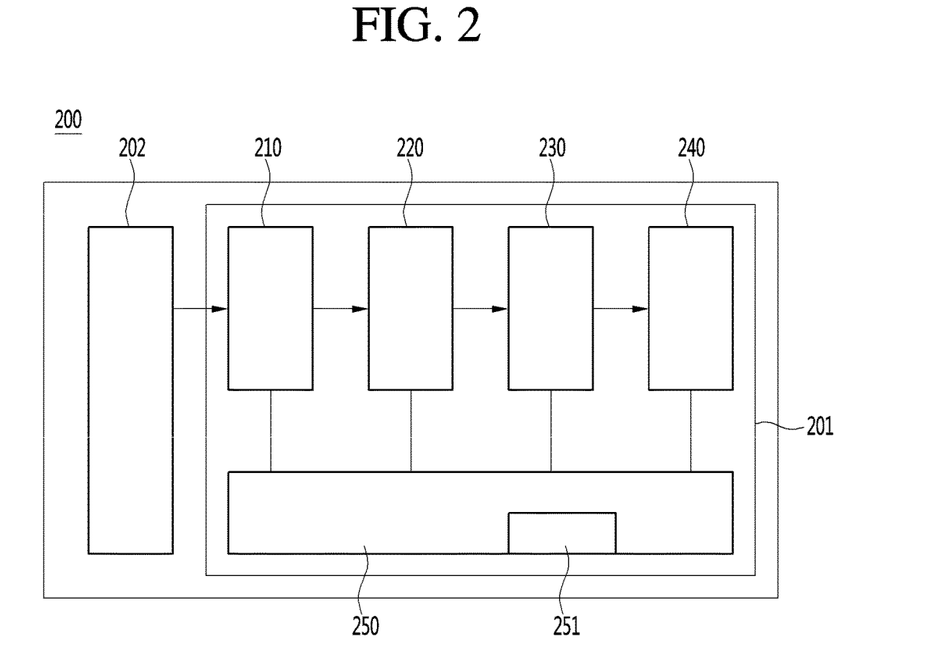
FIG. 2 is a block diagram illustrating a receiver according to an embodiment of the present invention.

Transmitter (transmission unit) (WPT system-charger): device for providing WPT to a plurality of power receivers within a magnetic field region, and managing the entire system Receiver (reception unit) (WPT-device): device for receiving WPT from a power transmitter within a magnetic field region Charging area: area in which actual WPT is performed within a magnetic field region and which may vary depending on the size, required power, and operating frequency of an application product FIG. 1 is a block diagram illustrating a transmitter of a WPT system according to an embodiment of the present invention, and FIG. 2 is a block diagram illustrating a receiver according to an embodiment of the present invention.

Referring to FIGS. 1 and 2, a WPT system 10 according to an embodiment of the present invention may include a transmitter 100 that wirelessly transmits power and a receiver 200 that receives power from the transmitter 100.

The receiver 200 may be provided in plural, and a device capable of wirelessly charging energy such as a terminal, a tablet PC, an electric automobile, etc., may be used as the receiver 200. Here, the transmitter 100 may provide power to the receiver 200 which has been authenticated through an authentication procedure with the transmitter 100.

Referring to a block diagram of a subsystem of the transmitter 100, the subsystem of the transmitter 100 may include a transmission power converter system 101 and a transmission antenna system 102.

The transmission power converter system 101 may include a plurality of subsystems, and as examples of the transmission power converter system 101, there may be a rectifying and filtering unit 110, a transforming unit 120, a power converting unit 130, a control unit 140, and a matching unit 150.

The rectifying and filtering unit 110 may generate a direct current (DC) voltage to be used in the next stage, and the generated DC voltage may be provided to the transforming unit 120 and thereafter become power to be supplied to the transmission antenna system 102. The rectifying and filtering unit 110 is a system that converts a provided alternating current (AC) signal into a DC signal, and as examples of implementing the rectifying and filtering unit 110, there are a diode rectifier having a relatively high efficiency at the time of high-frequency operation, a synchronous rectifier that can be configured as a one chip, and a hybrid rectifier that can realize cost and space-saving and has a high degree of freedom in dead time.

The transforming unit 120 may serve to adjust the level of DC power output from the rectifying and filtering unit 110 based on a control signal, convert a DC input voltage into a square wave voltage using a semiconductor device such as a power transistor as a switch, and then obtain a DC output voltage controlled through a filter.

At this point, the control of the DC output voltage is performed by controlling ON and OFF periods of the switch.

Since the operation of the transforming unit 120 is based on a conversion from a DC input to a DC output, the transforming unit 120 may be referred to as a switched-mode power supply (SMPS), a DC-DC transformer, or a DC-DC converter.

The transforming unit 120 may control an error by receiving a feedback of an output voltage, thereby outputting constant DC power.

The transforming unit 120 may have characteristics of any one of a buck converter in which an output voltage is lower than an input voltage, a boost converter in which an output voltage is higher than an input voltage, and a buck-boost converter having both the above-described two characteristics.

The level of an output DC voltage of the transforming unit 120 may be adjusted, and controlled by a control signal of the control unit 140.

The control unit 140 may be referred to as a microprocessor, a micro controller unit, or a Micom.

The control unit 140 may control the magnitude of the DC voltage output from the transforming unit 120 in consideration of maximum power transmission efficiency, a power demand of the receiver 200, a present charged amount of the receiver 200, and the like.

In addition, the control unit 140 may not only adjust the output voltage of the transforming unit 120 but also control the entire operation of the transmitter 100 using an algorithm, a program, or an application required for the control, which is read from a storage unit (not shown) of the transmitter 100.

The transmission power converter system 101 may further include a transmission side communication unit 141, and the transmission side communication unit 141 may perform communication with a reception side communication unit 251 of the receiver 200.

The transmission side communication unit 141 and the reception side communication unit 251 may perform communication using a Bluetooth communication method.

In addition, the transmission and reception side communication units 141 and 251 may transmit and receive power information to and from each other, and the power information may include at least one of a capacity of the receiver 200, a battery remaining amount, a charging frequency, an amount of use, a battery capacity, and a battery ratio.

In addition, the transmission side communication unit 141 may receive information about a received signal strength of the receiver 200 through received signal strength indication (RSSI) from the reception side communication unit 251, and the control unit 140 may be configured as one chip including the transmission side communication unit 141 to perform communication with the reception side communication unit 251.

In addition, the transmission side communication unit 141 may transmit and receive a charging function control signal for controlling a charging function of the receiver 200.

The charging function control signal may be a control signal that makes the charging function enabled or disabled by controlling the receiver 200. Alternatively, the power information may include information such as input of a wired charging terminal, switching from SA mode to NSA mode, releasing of an error situation, and the like.

Meanwhile, the transmission power converter system 101 may be configured by hardware different from the transmission side communication unit 141, so that the transmitter 100 may perform communication in an out-band type, and the transmission power converter system 101 and the transmission side communication unit 141 may be implemented in one piece of hardware so that the transmitter 100 may perform communication in an in-band type.

The transmission side communication unit 141 may be configured separately from the control unit 140, and the reception side communication unit 251 of the receiver 200 may be included in a control unit 250 of the receiver or configured separately from the control unit 250, as described above.

The power converting unit 130 may generate power by converting a DC voltage of a certain level into an AC voltage by a switching pulse signal in a band range of several tens of KHz to several tens of MHz. That is, the power converting unit 130 may generate "wake-up power" or "charging power" used in the receiver 200 that becomes a target, that is, enters in a charging area by converting the DC voltage into the AC voltage.

Here, the wake-up power refers to small power of 0.1 to 1 mWatt, and the charging power refers to power required for charging a battery of the receiver 200 or power consumed for the operation of the receiver 200 and large power of 1 mWatt to 200 Watt.

Meanwhile, the power converting unit 130 may include a power amplifier for amplifying the DC voltage output from the transforming unit 120 according to the switching pulse single.

The power converting unit 130 may be configured as a full bridge or half bridge inverter.

The matching unit 150 may be disposed at a rear end of the control unit 140, include at least one of at least one passive element and at least one active element, and perform impedance matching between the transmitter 100 and the receiver 200 so that power transmission efficiency may be maximized.

The impedance viewed from the matching unit 150 may be adjusted to control the output power to be high efficiency or high output. The matching unit 150 may adjust the impedance based on the control of the control unit 140 and the transmission side communication unit 141. In addition, the matching unit 150 may include at least one of a coil and a capacitor. The control unit 140 and the transmission side communication unit 141 may control the connection state with the at least one of the coil and the capacitor, and thereby perform impedance matching.

The transmission antenna system 102 may include one or more resonant coils.

In addition, the resonance coil may be provided in singular or in plural. When the resonance coil is provided in plural, the plurality of resonance coils may be arranged to overlap each other, and the overlapping area may be determined in consideration of the deviation of a magnetic flux density.

The receiver 200 may include a reception power converter system 201 and a reception antenna system 202.

The reception antenna system 202 of the receiver 200 may be the same as the transmission antenna system 102, and dimensions of the reception antenna may vary depending on electrical characteristics of the receiver 200.

In addition, the reception antenna system 202 may receive power through a self-resonant method. In this manner, the reception antenna system 202 may include one or more resonant coils according to a power reception method. The reception antenna system 202 may further include a near field communication antenna.

The reception power converter system 201 may include a matching unit 210, a rectifying unit 220, a reception side transformer 230, a load 240, and a reception side control unit 250.

The reception side control unit 250 may include a reception side communication unit 251, and the reception side communication unit 251 may be configured separately from the control unit 250.

The matching unit 210 performs impedance matching between the transmitter 100 and the receiver 200.

The rectifying unit 220 rectifies an AC voltage output from the reception antenna system 202 to generate a DC voltage.

The reception side transformer 230 may be configured as a DC/DC converter, and adjust the level of the DC voltage output from the rectifying unit 220 according to the capacity of the load 240.

The load 240 may include a battery, a display, a voice output circuit, a main processor, and various sensors.

The reception side control unit 250 may be activated by wake-up power from the transmitter 100, perform communication with the transmitter 100, and control the operation of the subsystem of the receiver 200.

The receiver 200 may be provided in singular or in plural, and simultaneously receive energy from the transmitter 100 in a wireless manner. That is, in a resonance type WPT system, a plurality of target receivers 200 may receive power from a single transmitter 100.

At this point, the matching unit 150 of the transmitter 100 may adaptively perform impedance matching between the plurality of receivers 200.

Meanwhile, when the receiver 200 is provided in plural, the plurality of receivers 200 may be the same kind of system or different types of systems.

<Detection and Power Transmission Operations of Receiver>

Figure 3:
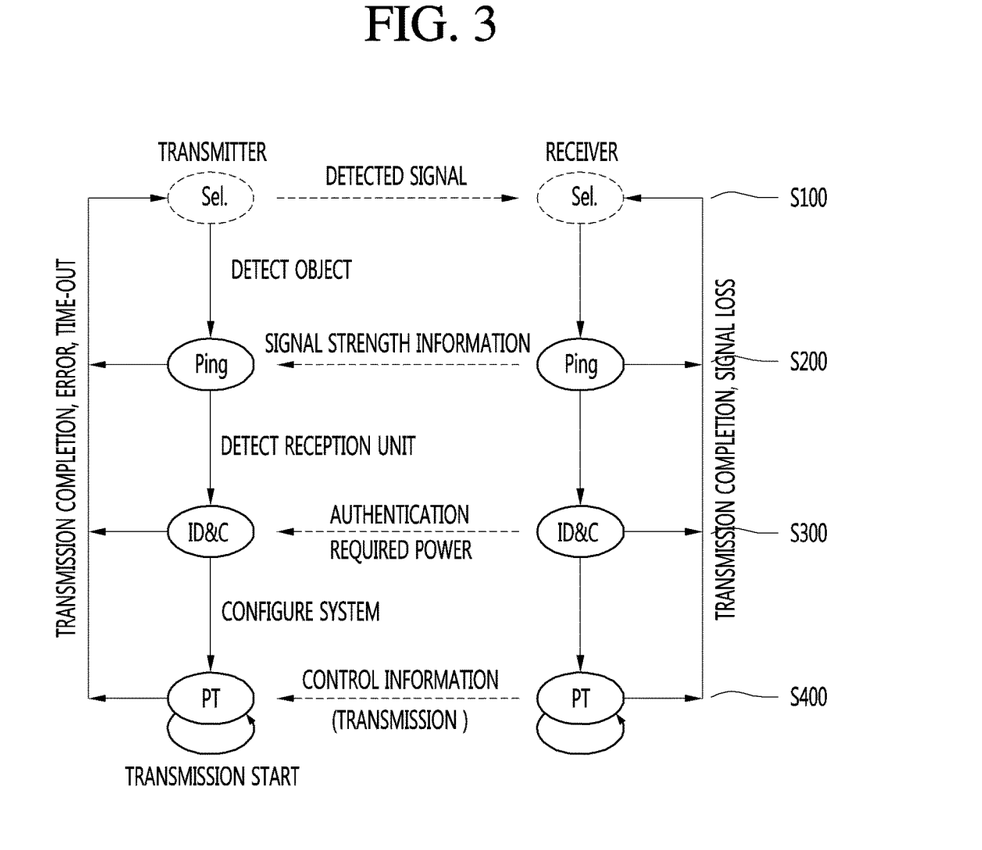
FIG. 3 is a diagram illustrating operations starting from detection of a receiver up to power transfer from a transmitter to a receiver in a WPT system according to an embodiment of the present invention.

FIG. 3 is a diagram illustrating operations starting from detection of a receiver up to power transfer from a transmitter to a receiver in a WPT system according to an embodiment of the present invention.

A control method can be roughly classified into four operations, and as the four operations, there are a detection operation of a receiver (selection, S100), a reaction determination operation (ping, S200), an authentication and configuration operation (identification & configuration, S300), and a power transfer operation (power transfer, S400).

In the detection operation of the receiver S100, the transmitter 100 transmits a signal for detecting the presence of the receiver 200, and waits for a response of the receiver 200.

The transmitter 100 may detect the receiver 200 by monitoring a change in a magnetic flux, a change in the capacitance or inductance between the receiver 200 and the transmitter 100, or a shift of a resonant frequency as a method for detecting the presence of the receiver 200 within a charging area, but the method for detecting the presence of the receiver 200 is not limited thereto. When the transmitter 100 detects the receiver 200 within the charging area, the method may proceed to the reaction determination operation S200 that is the next operation. In addition, when a material such as a metallic foreign substance is disposed in the charging area, the transmitter 100 may detect the material. Meanwhile, when the transmitter 100 does not obtain enough information to distinguish between the receiver 200 and the metallic foreign substance in the detection operation of the receiver S100, the method may proceed to the reaction determination operation S200 or the authentication and configuration operation S300 to determine the presence of the receiver 200 or the metallic foreign substance.

In the reaction determination operation 8200, the receiver 200 may transmit strength information of a signal, and the transmitter 100 may determine the presence of the receiver 200 through the strength information.

In the reaction determination operation S200, the transmitter 100 is connected to the chargeable receiver 200, and determines whether the rechargeable receiver 200 is an effective receiver 200 capable of being charged with wireless power supplied from the transmitter 100. Next, the transmitter 100 may generate and output a digital ping having a predetermined frequency and timing to be connected to the chargeable receiver 200. When a sufficient power signal for the digital ping is transmitted to the receiver 200, the receiver 200 may response to the digital ping by modulating the power signal according to a communication protocol. When the transmitter 100 receives a valid signal from the receiver 200, the method may proceed to the authentication and configuration operation S300 without removing the power signal. When a charging termination request is received from the receiver 200, the transmitter 100 may be switched to a charging termination state.

In the authentication and configuration operation S300, the receiver 200 transmits authentication and requested power information, and the transmitter 100 configures power transmission and prepares to transmit power.

In this case, compatibility between the transmitter 100 and the receiver 200 may be confirmed. When the compatibility between the transmitter 100 and the receiver 200 is confirmed, the receiver 200 may transmit authentication information to the transmitter 100. Next, the transmitter 100 may confirm reception unit authentication information of the receiver 200. Next, when authentication between the transmitter 100 and the receiver 200 is completed, the transmitter 100 may proceed to the power transfer operation S400, and when authentication between the transmitter 100 and the receiver 200 fails or exceeds a predetermined authentication time, the transmitter 100 may return to the detection operation of the receiver (selection) S100.

In the power transfer operation S400, the receiver 200 transmits control information, and the transmitter 100 starts power transfer. At this point, by controlling the transmitter 100 based on control data provided from the receiver 200 by means of the control unit 140 of the transmitter 100 and the transmission side communication unit 141, it is possible to provide charging power to the receiver 200.

When a corresponding signal is interrupted or fails during these four operations, the method may return to the first operation by time-out, or when abnormality is detected during the power transfer or the receiver 200 is out of the charging area or fully charged, the method may terminate the power transfer and return to the first operation. In addition, a corresponding temperature exceeds a predetermined limit temperature value, the transmitter 100 may stop the power transfer.

<Power Control Operation of Communication Signal According to First Embodiment>

Figure 4:
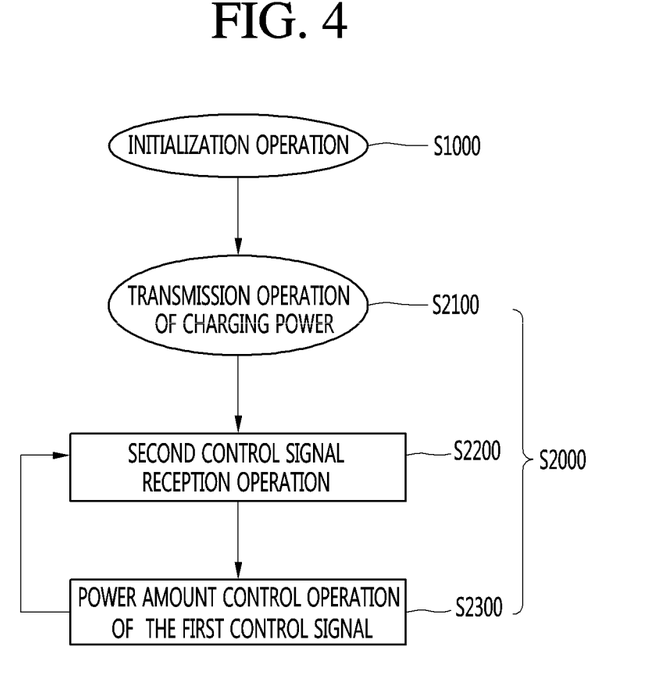
FIG. 4 is a block diagram illustrating a method for controlling an amount of power of a first control signal according to a first embodiment of the present invention.
Figure 5:
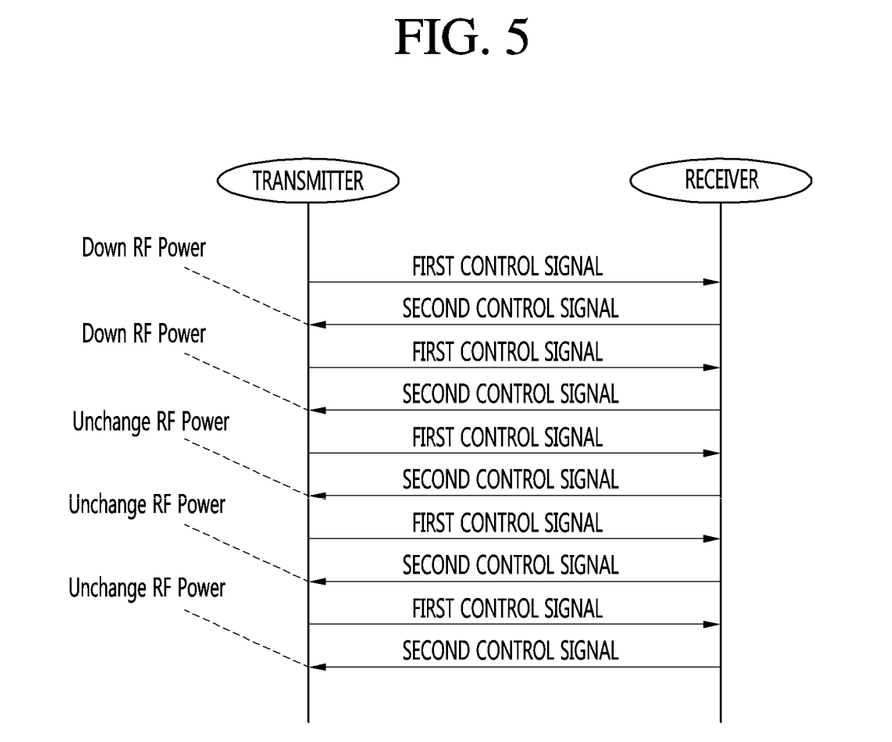
FIG. 5 is a flowchart illustrating a method for controlling an amount of power of a first control signal according to an embodiment of the present invention.

FIG. 4 is a block diagram illustrating a method for controlling an amount of power of a first control signal according to a first embodiment of the present invention, and FIG. 5 is a flowchart illustrating a method for controlling an amount of power of a first control signal according to an embodiment of the present invention.

FIGS. 4 and 5 show an operation in which the transmitter 100 transmits wireless power after detecting the receiver 200 and completely preparing to transmit charging power in a wireless manner.

The method may proceed to a power transfer operation S2000 after an initialization operation S1000 including the detection operation S100, the reaction determination operation S200, and the authentication and configuration operation S300 through communication (as an example, Bluetooth communication) between the transmission side communication unit 141 of the transmitter 100 and the reception side communication unit 251 of the receiver 200.

The transmitter 100 may periodically transmit a first control signal to the receiver 200. When receiving the first control signal, the receiver 200 may transmit a second control signal to the transmitter 100.

The first control signal may be a request signal for requesting transmission of the second control signal. The second control signal may include information about a charged amount of a battery within the receiver 200 and reception strength of the first control signal. In particular, the receiver 200 may measure the reception strength of the first control signal, and generate and output the second control signal including the information about the reception strength of the first control signal. The second control signal may be generated by the reception side communication unit 251 of the receiver 200 or the reception side control unit 250.

The first and second control signals may be radio frequencies (RF), so that an amount of power of the first and second control signals may be referred to as magnitude of RF power.

The transmitter 100 and the receiver 200 may transmit and receive information about RSSI and charging information to and from each other with RF, and transmit and receive information required for power transfer such as a charged state of the receiver 200, a charged amount of a battery, a power supply amount of the transmitter 100, etc., to and from each other.

At this point, the magnitude of the RF power which is the amount of power of the first and second control signals of the transmitter 100 and the receiver 200 may be −6 to 8.5 dBm, respectively.

The power transfer operation S2000 may include a transmission operation S2100, a second control signal reception operation S2200, and a power amount control operation of the first control signal S2300.

The transmission side communication unit 141 may receive the second control signal including RSSI for the reception strength of the first control signal, a charged state, and an amount of power of the first control signal from the reception side communication unit 251 at predetermined time intervals, and control the amount of power of the first control signal transmitted from the transmission side communication unit 141 to the reception side communication unit 251 based on the second control signal.

Specifically, when the amount of power of the first control signal is in a predetermined range based on a comparison therebetween, the amount of power of the first control signal may be maintained, and when the amount of power of the first control signal is out of the predetermined range, the amount of power of the first control signal may be lowered.

The predetermined range may be RF power corresponding to a standard range defined by A4WP, but is not limited thereto.

In addition, the predetermined range may be a value determined depending on whether the first and second control signals are decodable. That is, when the amount of power of the first and second control signals exceeds a sufficient amount of power so that the first and second control signals are decodable, the amount of power of the first and second control signals may be reduced. However, when the amount of power of the first and second control signals corresponds to a decodable minimum amount, the amount of power of the first and second control signals may be maintained.

In this manner, the amount of power of the first and second control signals transmitted and received between the transmitter 100 and the receiver 200 may be controlled. That is, the reception strength of the second control signal which the transmitter 100 receives and the reception strength of the first control signal which the receiver 200 receives may be kept not too high, so that interference to other communication systems in close proximity may be minimized.

Meanwhile, the charging power provided from the transmitter 100 to the receiver 200 uses a different frequency band from that of the first and second control signals. Accordingly, an interference phenomenon which is applied to an adjacent wireless power communication device using a frequency band overlapping with the frequency band of the first and second control signals is insignificant.

Figure 6:
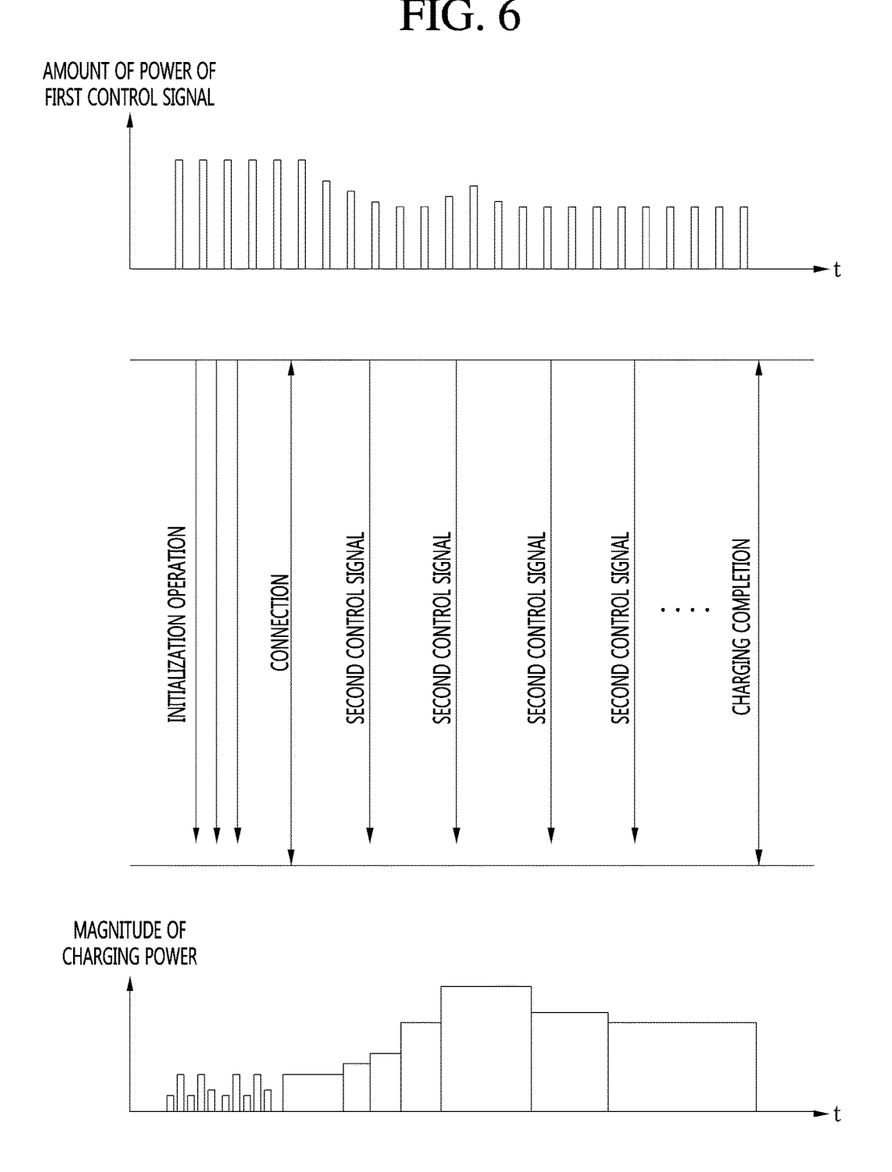
FIG. 6 is a flowchart illustrating an operation sequence of a WPT operation according to a first embodiment of the present invention.

FIG. 6 is a flowchart illustrating an operation sequence of a WPT operation according to a first embodiment of the present invention.

Referring to FIG. 6, it can be seen that the amount of power of the first control signal, that is, the magnitude of RF power is constant in the initialization operation. That is, the first control signal may be provided to the receiver 200 with a predetermined amount of power of the first control signal. Since the initialization operation is performed within a short time of less than 1 sec, the effect on other wireless communication devices is insignificant. Therefore, the amount of power of the first control signal may not be separately controlled.

Meanwhile, the first control signal may be output at a specific period in the initialization operation, and the specific period may vary within a specific range. As an example, the specific period may be adjusted within 50 ms or less, but it is not limited to 50 ms.

When the transmitter 100 is connected to the receiver 200 and ready to prepare to provide wireless power to the receiver 200, a corresponding process may proceed to the power transfer operation.

At this point, the first control signal including the strength of wireless charging power, RSSI information that is the reception strength of the second control signal provided from the receiver 200, and a request signal of the second control signal may be provided from the transmitter 100 to the receiver 200. Next, the second control signal including a present charged amount of a battery, a charged state, an amount of power of the received first control signal, an amount of charging power, strength of charging power, and RSSI information that is the reception strength of the first control signal provided from the transmitter 100 may be provided from the receiver 200 to the transmitter 100.

Meanwhile, the first control signal may be output at a specific period in the power transfer operation, and the specific period may vary within a specific range. As an example, the specific period may be adjusted within 250 ms or less, but is not limited to 250 ms.

In this manner, information required for wireless charging and RSSI information that is the reception strength may be transmitted and received between the transmitter 100 and the receiver 200.

Assuming that a range of the amount of power of the first and second control signals which is sufficient to decode the information transmitted and received between the transmitter 100 and the receiver 200 is within first to second set values (the second set value is larger than the first set value), when the amount of power of the first and second control signals is the second set value or larger, the amount of power of the first and second control signals may be lowered, and when the amount of power of the first and second control signals is the first set value or smaller, the amount of power of the first and second control signals may be controlled to be maintained within the first to second set values while being increased. Accordingly, it is possible to minimize the interference phenomenon that is applied to other adjacent wireless communication devices.

<Power Control Operation of Communication Signal According to Second Embodiment>

Figure 7:
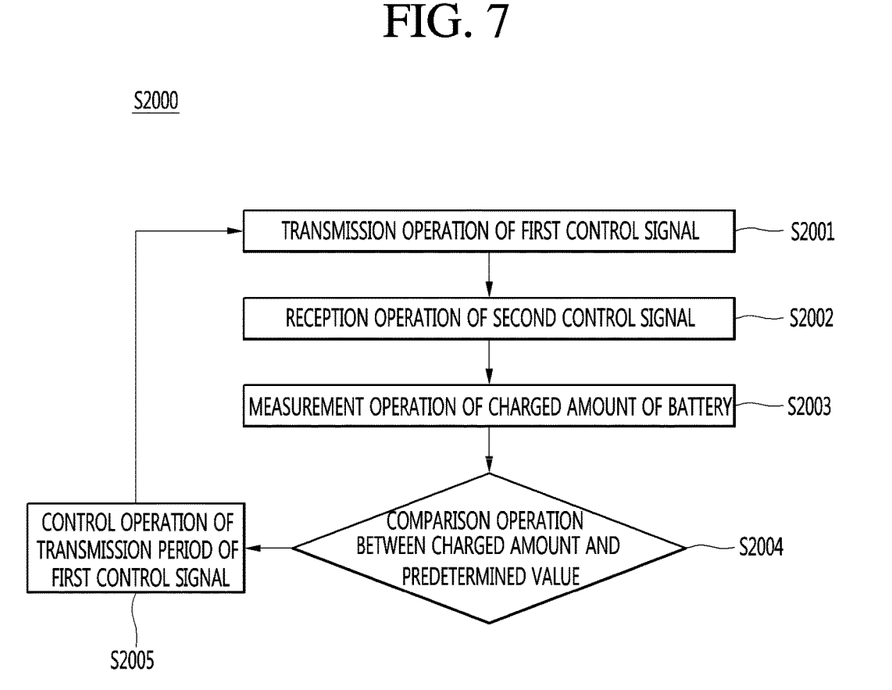
FIG. 7 is a block diagram illustrating a method for controlling an amount of power of a first control signal according to a second embodiment of the present invention.
Figure 8:
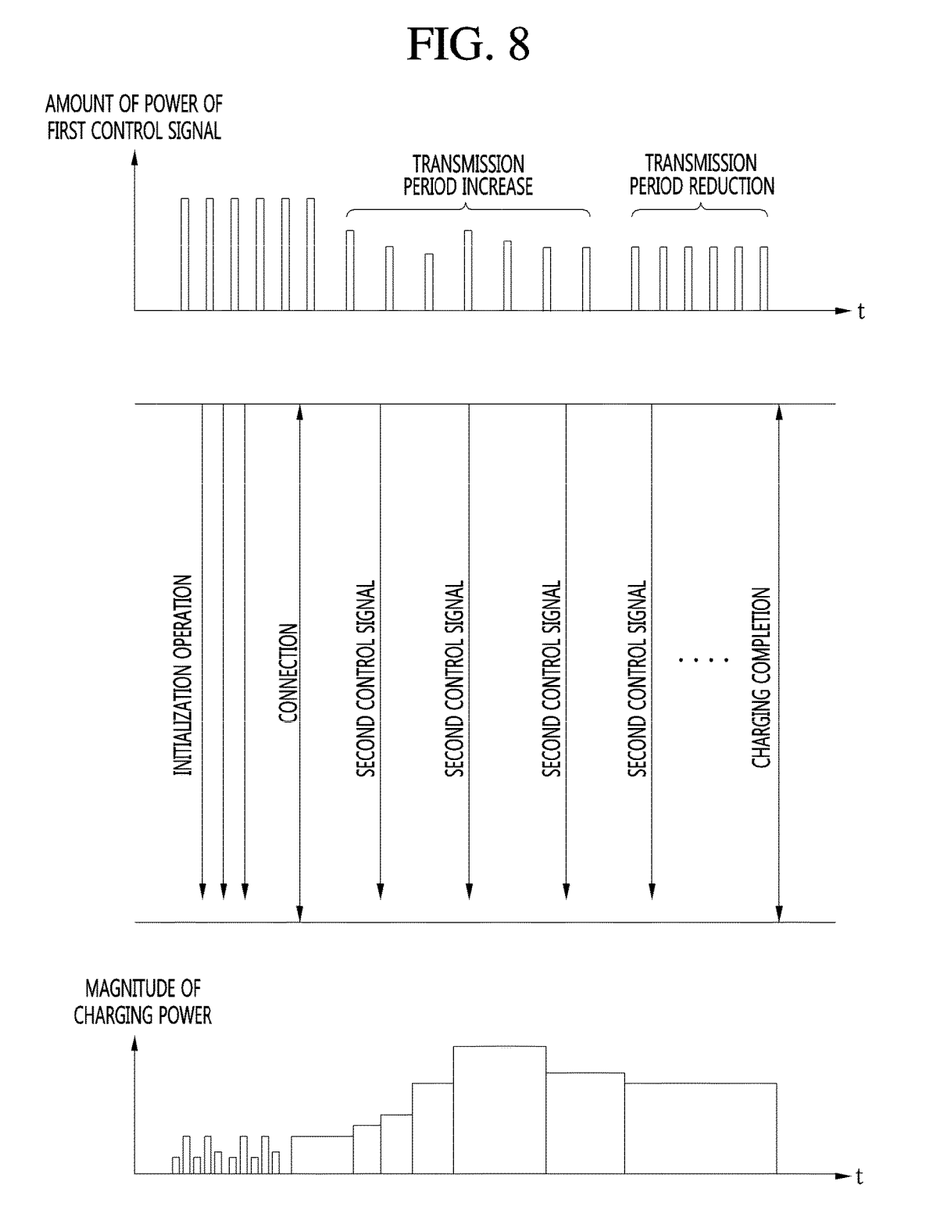
FIG. 8 is a flowchart illustrating a method for controlling an amount of power of a first control signal according to a second embodiment of the present invention.

FIG. 7 is a block diagram illustrating a method for controlling an amount of power of a first control signal according to a second embodiment of the present invention, and FIG. 8 is a flowchart illustrating a method for controlling an amount of power of a first control signal according to a second embodiment of the present invention.

The power transfer operation S2000 according to the second embodiment of the present invention may include a transmission operation S2001 in which the transmitter 100 transmits the first control signal to the receiver 200, a reception operation S2002 in which the transmitter 100 receives the second control signal from the receiver 200, a measurement operation 82003 in which a charged amount of a battery of the receiver 200 is measured, a comparison operation S2004 in which a charging amount and a predetermined value are compared, and a control operation S2005 in which a transmission period of the first control signal is controlled.

In the transmission operation S2001, the transmitter 100 may periodically transmit the first control signal to the receiver 200.

The first control signal may include reception strength (RSSI) of the second control signal which the transmitter 100 receives, an amount of wireless charging power to be transmitted, and a request signal for requesting transmission of the second control signal.

The transmitter 100 may obtain information about a charged state of the battery of the receiver 200 from the receiver 200 by the first control signal.

In the measurement operation 52003, the charged amount of the battery of the receiver 200 may be measured.

In the reception operation S2002, the receiver 200 may transmit the second control signal to the transmitter 100 in response to the request of the first control signal.

The second control signal may include information such as reception strength (RSSI) of the first control signal which the receiver 200 receives, a present charged amount of a battery, and an amount of wireless charging power to be received.

In the measurement operation 52003, the transmission side communication unit 141 of the transmitter 100 may measure the present charged amount of the battery of the receiver 200 based on the received second control signal.

In the comparison operation S2004, the transmission side communication unit 141 may determine whether the present charged amount of the battery is equal to or larger than the predetermined value or less than the predetermined value based on a comparison therebetween.

In the control operation S2005, when the present charged amount of the battery is less than predetermined value, the transmission period of the periodically transmitted first control signal may be increased, and when the present charged amount of the battery is equal to or larger than the predetermined value, the transmission period of the periodically transmitted first control signal may be reduced. That is, the transmission period of the first control signal may be adjusted according to the present charged amount of the battery, and the first control signal includes the request signal for requesting transmission of the second control signal from the receiver 200 so that the transmission period of the second control signal provided from the receiver 200 to the transmitter 100 may be also adjusted.

As an example, when the predetermined value is 85%, whether the charged amount of the battery is 85% or larger may be determined in the comparison operation S2004.

When the charged amount of the battery is 85% or larger, the transmission period of the first control signal may be reduced to a first period value in the control operation S2005.

In addition, when the charged amount of the battery is less than 85%, the transmission period of the first control signal may be increased to a second period value in the control operation S2005.

At this point, the second period value is larger than the first period value.

In this manner, when the charged amount of the battery is less than the predetermined value, it is desirable to increase the transmission period of the control signal to reduce a communication time interval between the transmitter 100 and the receiver 200 because an amount to be charged in the future remains much. However, when the charged amount of the battery is equal to or larger than the predetermined value, it is desirable to increase the number of times of checking the charged amount of the battery during the same time, that is, reduce the communication time interval between the transmitter 100 and the receiver 200 because an amount to be charged in the future does not remain much and charging for the battery can be done soon. In other words, wireless charging power may be supplied until the transmitter 100 receives the next second control signal from the receiver 200 even though the battery whose charging is to be done soon is fully charged. This is because unnecessary power can be wasted.

In this manner, when the remaining charged amount of the battery is less than the predetermined value by continuously measuring the present charged amount of the battery, the transmission period of the control signal may be increased, and therefore the interference phenomenon on an adjacent wireless communication device may be minimized.

As described above, the wireless power transfer (WPT) system 10 according to the first and second embodiments of the present invention may control the amount of power of the first and second control signals transmitted and received between the transmission side communication unit 141 of the transmitter 100 and the reception side communication unit 251 of the receiver 200 at the time of communication within a predetermined range or a standard range defined by A4WP while performing communication (as an example, Bluetooth communication) for exchanging information required for wireless charging between the transmission side communication unit 141 of the transmitter 100 and the reception side communication unit 251 of the receiver 200, thereby reducing a load on the WPT system 10. In addition, by adjusting the transmission period of the first and second control signals, power consumption may be reduced and charging efficiency may be increased. Moreover, the effect on other wireless communications may be minimized to improve a signal-to-noise (SNR) ratio, and therefore user convenience may be improved.

According to the embodiments of the present invention, it is possible to provide a WPT system capable of minimizing electrical interference to other wireless communication devices occupying an ISM band.

According to the embodiments of the present invention, it is possible to provide a WPT system capable of improving charging efficiency by varying a communication period between a transmitter and a receiver and reducing an interference phenomenon on other adjacent wireless communications.

According to the embodiments of the present invention, it is possible to provide a WPT system capable of reducing an interference phenomenon on other adjacent wireless communications by adjusting power of a communication signal between a transmitter and a receiver.

While the present invention has been particularly described with reference to exemplary embodiments, the present invention is not limited thereto. It will be understood by those skilled in the art that various modifications and applications, which are not illustrated in the above, may be made without departing from the spirit and scope of the present invention. For example, each of components illustrated in the embodiments may be modified and made. It should be interpreted that differences related to these modifications and applications are included in the scope of the invention defined in the appended claims.

INDUSTRIAL APPLICABILITY

The present invention can be used in a wireless power charging field related to a transmitter and a receiver capable of transmitting and receiving power wirelessly and a WPT system including the same.

What is claimed is:

1. A transmitter for transmitting wireless power comprising:
   a transmission side communication unit,
   wherein the transmission side communication unit outputs a first control signal, receives a second control signal from a reception side communication unit of a receiver in response to the first control signal, the second control signal including information of an amount of power of the first control signal, and adjusts the amount of power of the first control signal based on the information of the amount of power of the first control signal included in the second control signal, and
   wherein, when the amount of power of the first control signal is out of a predetermined range, the amount of power of the first control signal is reduced.

2. The transmitter for transmitting wireless power according to claim 1, wherein the second control signal further includes a charged amount of a battery of the receiver and reception strength information of the first control signal.

3. The transmitter for transmitting wireless power according to claim 2, wherein the first control signal is a request signal for requesting the second control signal.

4. The transmitter for transmitting wireless power according to claim 1, wherein, when the amount of power of the first control signal is within a predetermined range, the amount of power of the first control signal is maintained.

5. The transmitter for transmitting wireless power according to claim 1, wherein the receiver receives charging power in a resonant method.

6. The transmitter for transmitting wireless power according to claim 1, wherein the transmission side communication unit and the reception side communication unit perform communication in a Bluetooth method.

7. The transmitter for transmitting wireless power according to claim 1, wherein, in an initialization operation in which the transmitter detects the receiver and prepares to transmit wireless charging power, the amount of power of the first control signal is constant.

8. The transmitter for transmitting wireless power according to claim 6, wherein the transmission side communication unit and the reception side communication unit occupy an industrial scientific and medical (ISM) band using the Bluetooth method.

9. A transmitter for transmitting wireless power comprising:
   a transmission side communication unit,
   wherein the transmission side communication unit transmits a first control signal to a reception side communication unit of a receiver, receives a second control signal from the reception side communication unit, the second control signal including information of a charged amount of a battery of the receiver, and compares the charged amount of the battery and a predetermined value to adjust a transmission period of the first control signal,
   wherein, when the charged amount of the battery of the receiver is equal to or larger than the predetermined value, the transmission period of the first control signal is reduced, and
   wherein, when the charged amount of the battery of the receiver is less than the predetermined value, the transmission period of the first control signal is increased.

10. The transmitter for transmitting wireless power according to claim 9, wherein the second control signal includes reception strength information of the first control signal.

11. The transmitter for transmitting wireless power according to claim 10, wherein the first control signal is a request signal for requesting the second control signal.

12. The transmitter for transmitting wireless power according to claim 9, wherein the receiver receives charging power in a resonant method.

13. The transmitter for transmitting wireless power according to claim 9, wherein the transmission side communication unit and the reception side communication unit perform communication in a Bluetooth method.

14. The transmitter for transmitting wireless power according to claim 9, wherein, in an initialization operation in which the transmitter detects the receiver and prepares to transmit wireless charging power, the transmission period of the first control signal is constant.

15. The transmitter for transmitting wireless power according to claim 13, wherein the transmission side communication unit and the reception side communication unit occupy an ISM band using the Bluetooth method.

* * * * *